US007770489B2

(12) United States Patent
Ruhlander

(10) Patent No.: US 7,770,489 B2
(45) Date of Patent: Aug. 10, 2010

(54) INTEGRATED CABLE CONNECTION AND SHIFTER HOUSING

(75) Inventor: Gregory P. Ruhlander, Hannibal, MO (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 1220 days.

(21) Appl. No.: 10/826,133

(22) Filed: Apr. 16, 2004

(65) Prior Publication Data

US 2004/0255712 A1 Dec. 23, 2004

Related U.S. Application Data

(60) Provisional application No. 60/463,489, filed on Apr. 17, 2003.

(51) Int. Cl.
*F16C 1/10* (2006.01)

(52) U.S. Cl. .................................................... 74/500.5

(58) Field of Classification Search ................ 74/500.5, 74/502.4, 503, 519, 523
See application file for complete search history.

(56) References Cited

U.S. PATENT DOCUMENTS 3,101,821 A * 8/1963 Henry ........................ 477/113
4,034,622 A * 7/1977 Deck ......................... 74/500.5
5,347,882 A 9/1994 Klotz ........................ 74/502.4
5,448,926 A * 9/1995 Reasoner ................... 74/500.5
5,862,710 A 1/1999 Koenig ...................... 74/502.4
5,865,066 A * 2/1999 Osborn et al. ............. 74/502.4
5,884,531 A 3/1999 Koenig ...................... 74/502.4
6,024,509 A * 2/2000 Walter et al. ................ 403/197
6,105,458 A 8/2000 Casas Gomila et al. .... 74/502.4
6,119,543 A * 9/2000 Webb ........................ 74/502.4
6,308,395 B1 * 10/2001 Webb .......................... 29/453
6,499,909 B1 * 12/2002 Scheidling et al. .......... 403/351
6,658,706 B2 12/2003 Scheidling et al. ....... 24/573.11

* cited by examiner

*Primary Examiner*—Vicky A Johnson
(74) *Attorney, Agent, or Firm*—Reising Ethington; Matthew J. Schmidt; Dean B. Watson

(57) ABSTRACT

An integrated operator cable-connector and base housing for an automotive shifter mechanism includes a generally cylindrical opening in the base housing, an isolator installed onto one end of a steel sleeve compressed against one or more shoulders in the opening and held therein with a cap snap fitted to a protrusion on the base housing. A swivel tube has a head portion captured between facing partially spherical seats formed on an end of the isolator and an interior portion of the base housing respectively, and a rod laterally supported and slidable therein. The operator cable has its case crimped into a protruding end of the sleeve and its core wire passed through a plastic tubular insert in the sleeve, an opening in the end of the isolator, and the inside of the swivel tube to a rod to which it is attached to the rod slidable in the swivel tube.

20 Claims, 5 Drawing Sheets

30
28
32
14
24
26
12
22
10
20
12
16
18

40
42
14
26
36
38
48
22
56
54
74
74
76
72
73
24
64
27
53
70
50
12
20

INTEGRATED CABLE CONNECTION AND SHIFTER HOUSING

CROSS REFERENCE TO RELATED APPLICATION

This application claims the benefit of U.S. provisional Ser. No. 60/463,489, filed Apr. 17, 2003.

BACKGROUND OF THE INVENTION

Motion-transmitting remote control cable assemblies, sometimes referred to as "Bowden cables" or "push-pull cables", are used for transmitting both force and motion along a curved path in aircraft, automotive, and marine environments. Known cable assemblies can be used for transmitting load and motion in both push and pull type applications. In the automotive environment, typical applications include but are not limited to parking brakes, accelerators, hood releases, brake releases, trunk releases, park lock, tilt wheel controls, fuel filler doors, transmission shifter cables, and hydraulic control cables. One specific use of such remote control cable assemblies is positioning transmission shift members in automobiles.

These cables include an inner core wire used to execute the actuation motion, and an outer case held stationary. The outer case typically includes a liner tube and a wire windings around the tube creating a strong case, which is then coated with nylon to provide an outer covering.

This invention concerns connectors for shift cables used to operate automatic transmissions, four wheel drive transfer cases, etc., by movement of a shift lever in the driver's compartment. The shift lever is usually connected to various linkage components contained in a shifter housing including a base housing and a cover. Such connections must prevent moisture from entering the housing and the transmission of sound and vibrations to the housing, as well as to establish a mechanical coupling of the operating cable thereto. Heretofore, a connector was separately assembled to the cable, and then the connector was assembled to the shifter base housing. This separate assembly necessitated a separate seal to the housing and a number of other manually installed components to couple the connector to the base housing in addition to the components necessary to isolate and seal the connector to the cable, which added components created significant labor and component costs.

It is the object of the present invention to provide a simplified integrated connection between the cable and the housing in order to lower the handling and assembly labor and the number of components required while still providing good performance in the field.

SUMMARY OF THE INVENTION

The above recited object and others which will be understood upon a reading of the following specification and claims are achieved by integrating a connector with a shifter housing, the connector comprised of simple snap together parts and structure integral with the base housing.

An elastomeric isolator enclosing one end of a metal sleeve is inserted into a generally cylindrical bore in the protrusion from the outside of the housing, abutted against shoulders form in the inside of the protrusion bore, the isolator is also formed with an integral partially spherical seat which is abutted against a ball end of the swivel tube.

A cap is installed in place over the end of the protrusion compressing the protruding end of the isolator, the cap having one or more wing features snap fit over an exterior shoulder on the housing protrusion to capture and hold these components in position.

The isolator provides a moisture seal and sound vibration isolation between the housing and the connector and the cable to minimize the number of components, which also may be very quickly assembled to the housing base to connect and seal the cable thereto.

The isolator is assembled or overmolded onto the one end of the metal steel sleeve to enclose the same, a flanged tubular plastic insert also previously molded or assembled to the end of the steel sleeve, forming a single unitary piece.

The base housing is formed with an internal tubular protrusion configured to receive a swivel tube inserted from outside the housing, the swivel tube having a ball end which comes to rest in a partially spherical seat molded into the protrusion when the swivel tube is inserted into a concentric hole aligned with the seat, the hole allowing the body of the swivel tube to pass into the interior of the base housing.

The metal sleeve is crimped to an operator cable case, while the cable core wire passes through the sleeve, through a guide opening in the plastic tube insert, and thence through a hole in the partially spherical seat in the isolator which holds the ball end of the swivel against the partially spherical seat molded into the housing protrusion. The cable core wire also extends through the swivel tube and is fixed to one end of a rod to be connected to linkage components driven by a shift lever, which rod is slidably received in the other end of the swivel tube.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
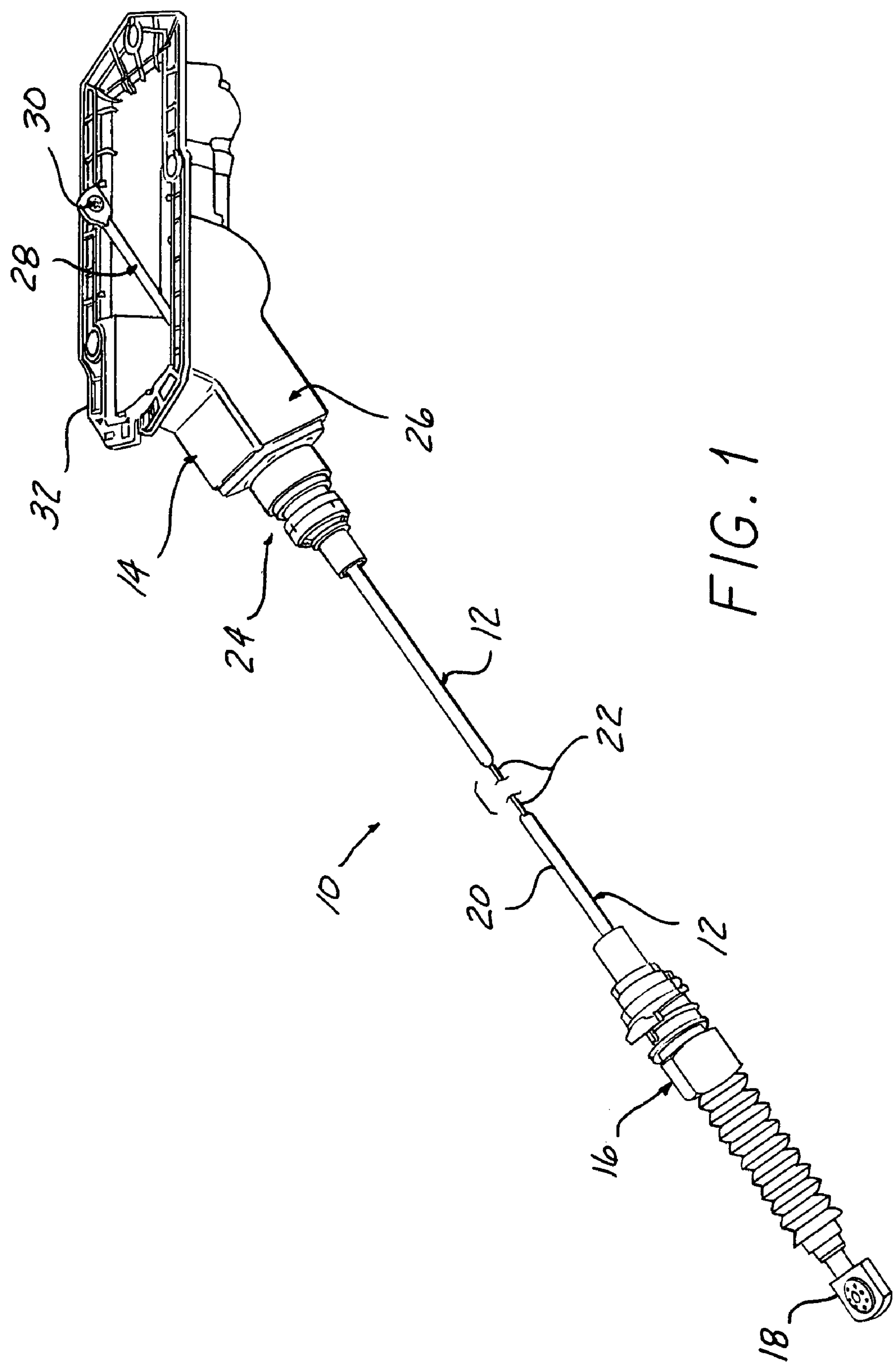
FIG. 1 is a pictorial view of an operator cable and base housing assembly.

Referring to the drawings and particularly FIG. 1, a cable shifter housing assembly 10 includes an operator cable 12 and base housing member 14. The cable 12 has a fitting assembly 16 for connection to a vehicle drive unit to be controlled (not shown), including an end piece 18 received on a control element of the unit to be controlled. The cable 12 includes an outer case 20 and a core wire 22 which moves within the case 20 to carry out the actuating movement required to operate the controlled unit, in the well known manner.

Figure 5:
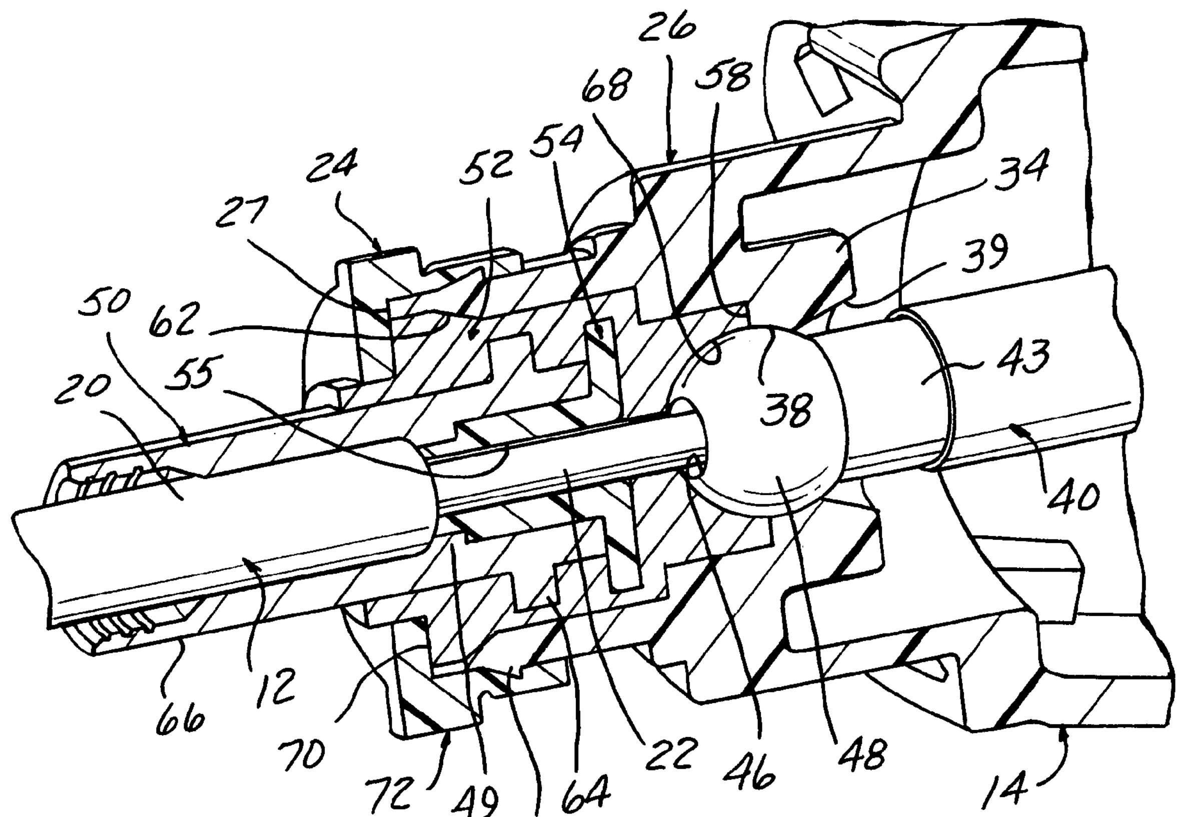
FIG. 5 is a further enlarged partially sectional view of the cable connector components and a protrusion portion of the base housing.

The cable 12 is secured to the base housing 14 by an integrated connector-isolator assembly 24 fit within a generally cylindrical opening 56 (FIG. 5) over a protrusion 26 of the base housing 14. The base housing 14 is installed in the vehicle passenger compartment and houses a steel shift rod 28 having an eye 30 at its free end to be able to be connected to various linkage components (not shown) enclosed within the base housing 14 and moved by a control lever (also not shown) accessible in the passenger compartment so that the driver can operate the controlled unit. A cover (not shown) would normally overlie the interior of the base housing 14, secured to housing flange 32.

Figure 2:
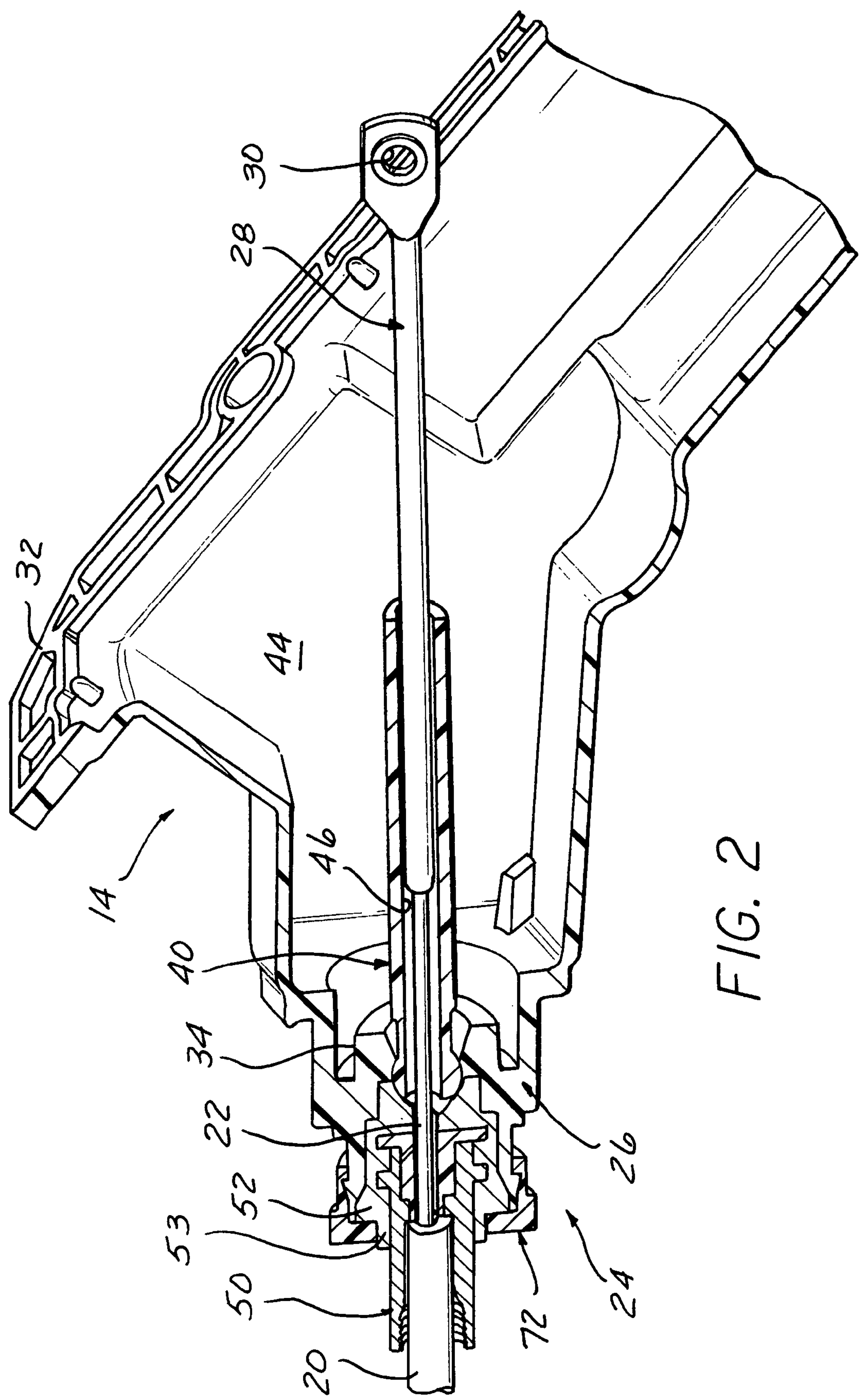
FIG. 2 is an enlarged fragmentary view in partial section of the base housing and cable connector components of the assembly shown in FIG. 1.
Figure 3:
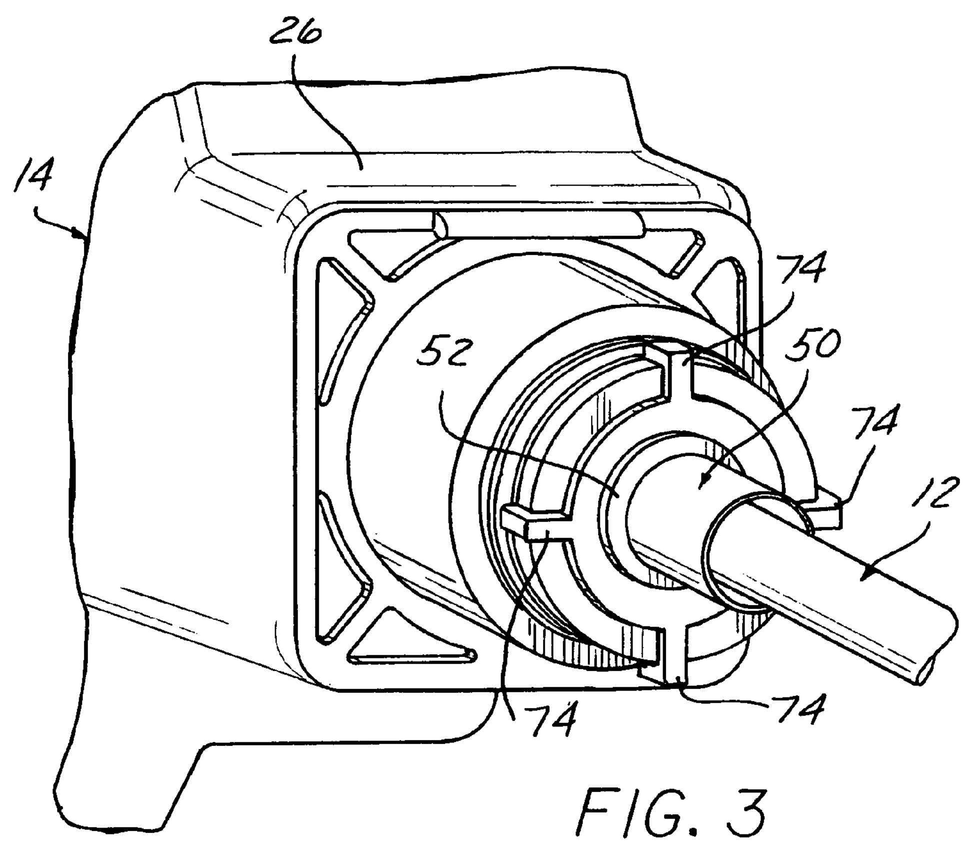
FIG. 3 is an enlarged fragmentary exterior view of the base housing and a portion of the operator cable.
Figure 4:
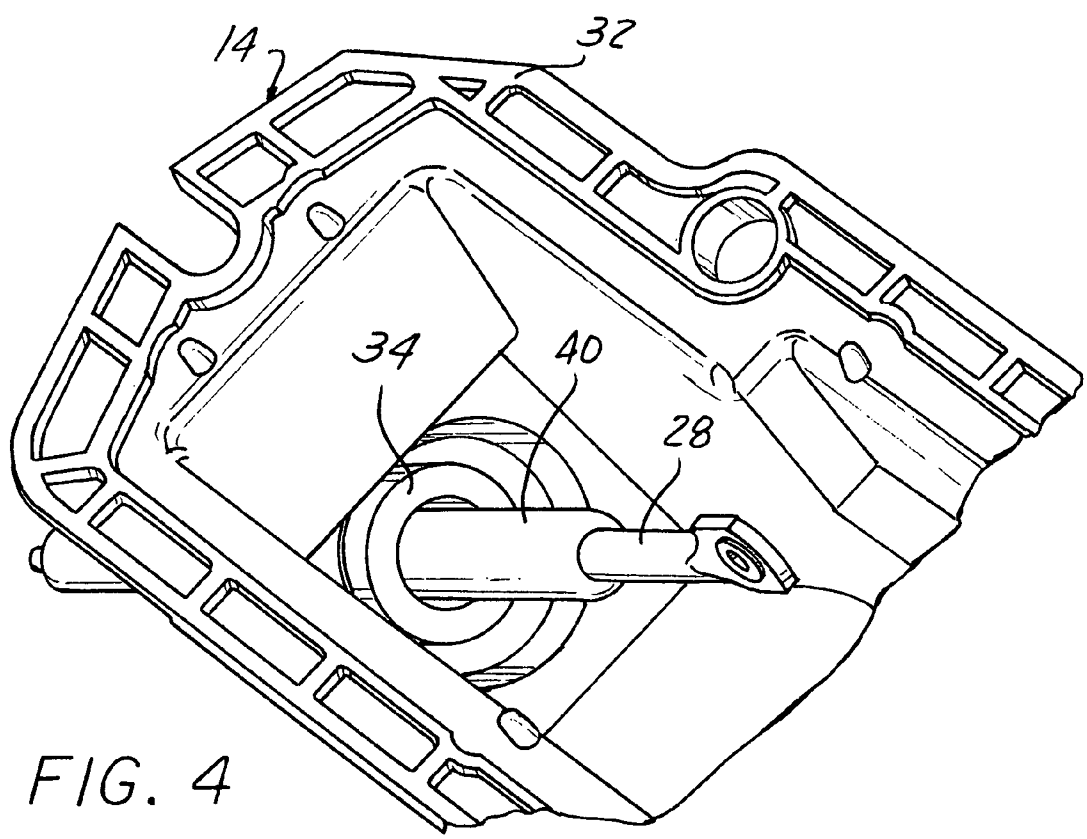
FIG. 4 is an enlarged fragmentary view from the interior of the base housing showing one end of the swivel tube and operating rod.

FIG. 2 shows further details of the integrated connector isolator assembly 24.

The base housing 14 which may be constructed of a suitable molded structural plastic, such as a glass filled nylon, includes the generally cylindrical protrusion 26 which functions as an integrated cable connector housing.

An inner projecting tube portion 34 has a partially spherical seat 38 concentric to a central bore through which the body 42 of a plastic swivel tube 40 passes in extending into the interior space 44 of the base housing 14. A reduced diameter land 43 of the body 42 is provided to increase clearance with a flared wall 39 and to increase the spherical area of the ball head 48 of the swivel tube 40. The partially spherical seat 38 engages the generally spherical ball head 48 of the swivel tube 40 integral with the body 42 to prevent movement of the swivel tube 40 into the interior space 44 of the basing housing 14 while allowing a limited tilting of the rod 28 which is slidably fit therein to accommodate the lengthwise movement induced by movement of the connected linkage components.

A flared wall 39 around the seat 38 accommodates the tilting of the swivel rod 40 to increase the extent of tilting possible.

The cable core wire 22 passes through an opening 46 in the swivel tube 40 with a generous clearance to avoid contact therewith, and the end extends into a hole in the end of the rod 28, in which it is fixedly connected as by a crimping or staking at the inserted end of the rod 28.

The swivel tube 40 provides lateral support for the rod 28 as it undergoes telescoping sliding movement therein and limited tilting caused by operation of the linkage components (not shown).

A metal sleeve 50 has an isolator 52 assembled over one end of the sleeve 50 to enclose the same. A plastic flanged tubular insert 54, is molded or assembled to the same one end of the sleeve 50 lining the inside of the one end of the sleeve 50. The one end of the sleeve 50 is inserted into a generally cylindrical opening 56 of the housing protrusion 26 after the addition of the isolator 52 and insert 54. The generally cylindrical opening 56 has two steps or shoulders 58, 60 and a tapered shoulder 62 molded therein against which are abutted corresponding features on the isolator 52.

The isolator 52 may be molded in two or more transverse sectional parts to enable easy assembly over the flanges on the sleeve 50 and insert 54. Alternatively, the isolator 52 may be overmolded to the one end of the sleeve 50.

The metal sleeve 50 is typically made of steel and has an intermediate flange 64 which acts to transmit the thrust exerted by the outer casing 20 when the cable 12 is operated into the isolator 52. The flange on the plastic tubular insert 54 also assists in this.

The isolator 52 is designed to absorb any sound or vibrations transmitted along the cable 12 to prevent these from reaching the base housing 14 in the known manner, and also acts as a seal, and thus is constructed of a resilient material such as polyurethane, rubber, silicone rubber or similar materials. A hardness on the order of Shore A 50-60 is desirable to provide sufficient stiffness to hold the case 20 of the cable 12 while elastic enough to seal to the sleeve 50 and housing 14 and to absorb any sound or vibrations.

Figure 6:
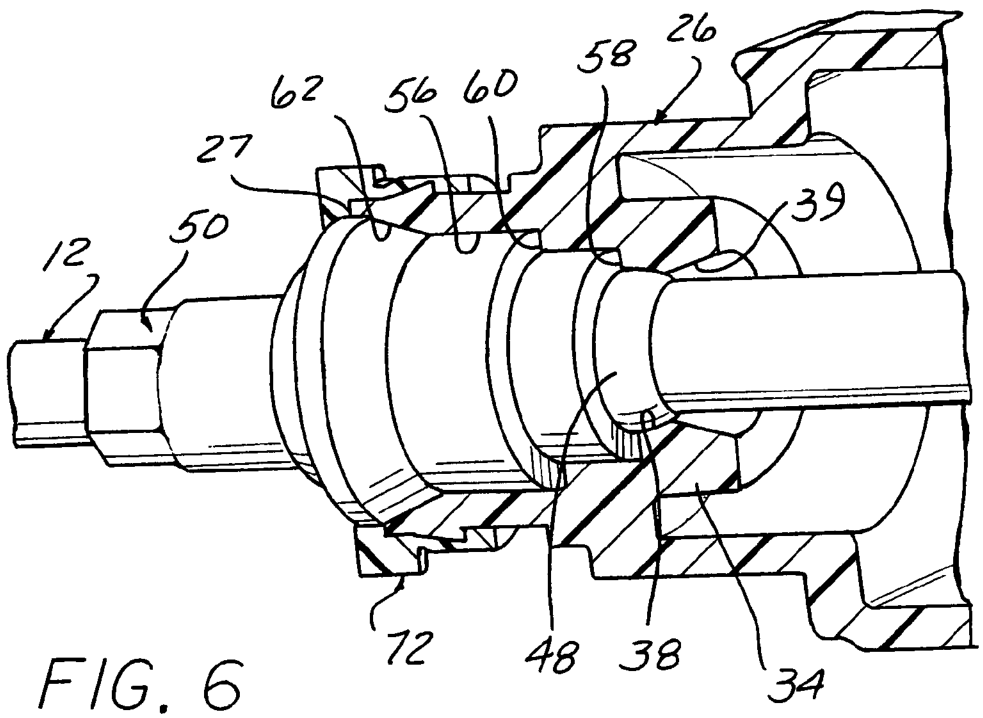
FIG. 6 is an enlarged partially sectional view of the base housing protrusion with a nonsectional view of the isolator, swivel tube and steel sleeve components.

The sleeve 50 is secured to the case 20 of the cable 12 as by hex crimping the ribbed end 66 to the case 20 in the known manner as depicted in FIG. 6. A flange 49 on the sleeve 50 acts as a stop to locate the cable case 20 endwise when inserted therein prior to crimping.

The isolator 52 is formed with a partially spherical seat 68 which captures the ball end 48 of the swivel tube 40, by abutting the same when the isolator 52 is inserted into the opening 56.

Figure 7:
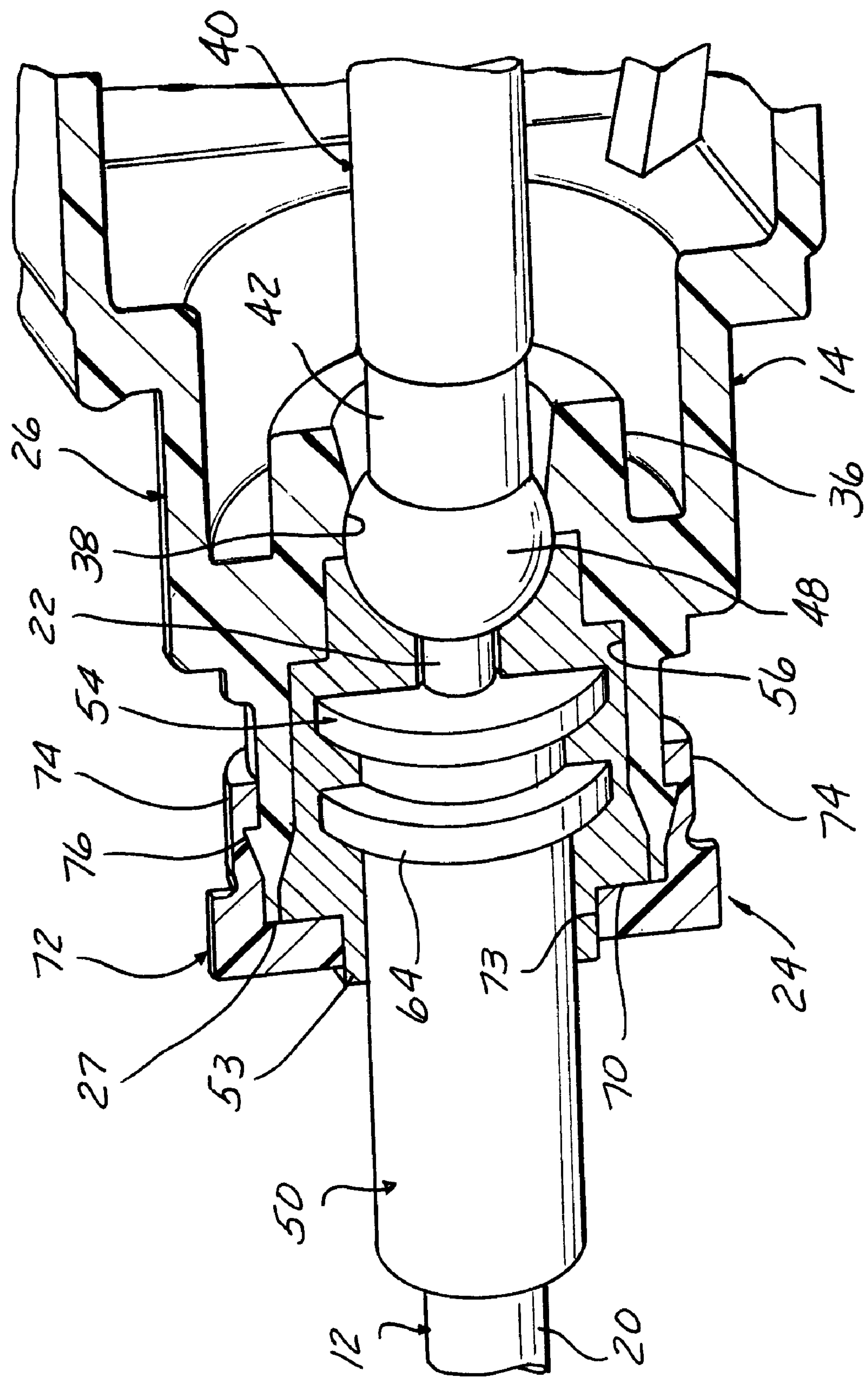
FIG. 7 is a further enlarged partially sectional view of the components shown in FIG. 6 but with the isolator shown in complete section.

The isolator 52 and metal sleeve 50 are inserted from the left as viewed in the drawings into the opening 56. The end face 70 of the isolator 52 projects slightly past the end 27 of the housing protrusion (FIG. 7). A snap cap 72 is then advanced onto a reduced diameter section 53 (FIG. 7) of the isolator 52 to compress the same slightly until wings 74 snap over a sloping ridge 76 to catch on the perpendicular rear face thereof. This secures the assemblage of these parts together.

The isolator 52 acts as a seal against both the housing 14 and sleeve 50, as well as a sound/vibration isolator preventing transmission of sound or vibrations between the sleeve 50 and housing 14.

The snap cap 72 is constructed of a molded plastic such as unfilled nylon to be strong enough to hold the parts together yet able to be deflected to be snap fit over the ridge 76.

Accordingly, the cable 12 and base housing 14 form a single assembly, reducing the possibility of dislodgement, loosening or moisture leakage into the housing 14 while eliminating extra seals and other components necessary if the cable and connector 24 were assembled together separately from the housing 14.

The isolator 52 end portion 53 protrudes through the hole 73 in the snap cap 72 to insure that no direct contact with the metal sleeve 50 occurs, assuring complete isolation between the sleeve 50 and housing 14 to prevent transmission of sound and vibration thereto.

The plastic insert 54 has an aligned passage 55 which acts as a guide for the cable wire core 22, without causing undue wear as the wire core 22 is shifted back and forth to operate the transmission. There is sufficient clearance within the swivel tube 40 to insure minimal contact therewith to minimize wear.

To assemble the components, the swivel tube 40 is inserted into the housing through the bore 56 of the housing protrusion 26, the ball end 48 resting on the seat 38. The sleeve-isolator assemblage is then inserted into bore 56 and the cap 72 installed by snap fitting onto the protrusion 26.

The cable 12 is then inserted to abut the case 20 against the flange 49, with the wire core 22 then advanced through the sleeve 50, insert 54 through the swivel tube 40, and the end thereof inserted into a hole in one end of the steel rod 28. The cable wire core 22 crimped or staked thereto or otherwise fixedly attached to the rod 28. The steel rod 20 is slid into the swivel tube 40 as the wire core 22 is retracted, the cable case 20 thereafter crimped to the steel sleeve 50.

The invention claimed is:

1. A shifter base housing, shift rod and operator cable assembly, said assembly comprising:

an operator cable having an outer case containing a movable core wire;

a shifter base housing defining an interior space;

an opening extending through a wall of said shifter base housing and into said interior space;

a sleeve having one end extending into said opening, said sleeve having said operator cable secured within an other end of said sleeve;

an elastomeric isolator-seal substantially enclosing said one end of said sleeve, said isolator-seal received in said opening and compressed against one or more surfaces defined therein to seal said sleeve one end to said shifter base housing;

said operator cable outer case secured within said other end of said sleeve, said core wire extending completely through said sleeve;

a shift rod extending across said interior space and attached at one end to said cable core wire;

wherein said shifter base housing has an integrally formed tubular projection defining a seat and a central opening receiving said cable core wire passed through said sleeve, and a swivel tube having a head resting in said seat and a tubular body extending through said central opening into said interior space of said shifter base housing, said cable core wire extending through an opening in said head and within said tubular body.

2. The assembly according to claim 1 wherein said opening is formed in a protrusion integrally formed on said shifter base housing, and said isolator-seal is held in said opening by a cap held on an end of said protrusion.

3. The assembly according to claim 2 wherein said cap has one or more features snap fit over a feature on said protrusion.

4. The assembly according to claim 2 wherein said cap has an opening within which said sleeve protrudes in extending into said opening

5. The assembly according to claim 4 wherein said isolator-seal has a reduced diameter end which protrudes out through said cap opening.

6. The assembly according to claim 1 further including a tubular plastic insert in said sleeve one end inserted within said generally cylindrical opening, said cable core wire passing through said tubular plastic insert.

7. The assembly according to claim 6 wherein said tubular plastic insert has a flange extending radially out and abutting one end of said sleeve.

8. The assembly according to claim 1 wherein said sleeve has a flange formed therein extending out into surrounding portions of said isolator-seal.

9. The assembly according to claim 1 wherein said seat is partially spherical, aligned with said opening extending through a wall of said shifter base housing and located inwardly therefrom, said seat facing back towards said sleeve.

10. The assembly according to claim 9 wherein said isolator-seal has an inner end formed with a partially spherical seat facing said partially spherical seat formed in said shifter base housing, said swivel tube head captured therebetween so as to accommodate tilting of said swivel tube.

11. The assembly according to claim 10 wherein said shift rod is slidable in said swivel tube body.

12. The assembly according to claim 1 wherein said tubular projection has outwardly flaring inner wall allowing tilt of said swivel tube, and said swivel tube has a reduced diameter land adjacent to said ball head.

13. The assembly according to claim 1 wherein said sleeve is constructed of steel, said sleeve crimped to said operator cable case.

14. A method of assembling an operator cable having an outer case and an inner core wire movable therein to a shifter base housing and a shift rod for operating an automotive drive unit, said shifter base housing defining an interior space closed with a cover, said method comprising:

integrally forming an opening in a wall of said shifter base housing extending into said interior space, and providing a projection formed in one-piece with said wall, said projection defining a seat and a central opening aligned with said opening;

positioning a swivel tube against said seat with a tubular body of said swivel tube extending through said central opening;

substantially enclosing one end of a sleeve with an elastomeric isolator-seal;

inserting said one end of said sleeve and isolator-seal into said opening;

compressing and holding said isolator-seal against one or more surfaces in said opening to cause said sleeve one end to be sealed to said shifter base housing;

passing said operator cable into an opposite end of said sleeve and fixing said outer case within said opposite end of said sleeve;

extending said inner core wire through said sleeve and into said swivel tube that extends into said interior space of said shifter base housing member; and, attaching said inner core wire to one end of said shift rod, said shift rod extending from said core wire across said interior space, said shift rod completely underlain by said shifter housing base.

15. The method according to claim 14 wherein said isolator-seal is compressed against said one or more shoulders in said opening by installing a cap against an end of said isolator-seal and locking said cap to a protrusion formed on said shifter base housing.

16. The method according to claim 14 wherein the seat is partially spherical, and wherein the method further includes passing a body of the swivel tube through said central opening to bring a partially spherical head portion on an end of said swivel tube into abutment with said seat, forming a partially spherical seat on an end of said isolator-seal facing said seat formed on said shifter base housing inner portion and forced against said head of said swivel tube, and extending said cable core wire through an opening in said isolator seat and swivel tube head, and into said swivel tube.

17. The method according to claim 14 further including installing a tubular plastic insert into a portion of the length of an inner passage in said sleeve and passing said cable core wire through an opening extending along said tubular plastic insert.

18. The method according to claim 15 wherein said cap is locked to said protrusion by snap fitting a feature formed on said cap to a feature formed on said protrusion.

19. The method according to claim 17 further including forming a flange on said insert and also on a portion of said sleeve enclosed in said isolator-seal acting to compress said isolator-seal when said cable is operated.

20. The method according to claim 16 further including inserting one end of said shift rod into said swivel tube and slidably fitting said shift rod therein.

* * * * *